United States Patent [19]

Moore et al.

[11] Patent Number: 5,435,210
[45] Date of Patent: Jul. 25, 1995

[54] DIFFERENTIAL DRIVE MECHANISMS

[75] Inventors: John W. Moore, West Sussex, England; John C. Carden, Nassau, Bahamas

[73] Assignees: Ricardo Consulting Engineers Limited, Shoreham-by-Sea, England; Axial Wave Drive BV Bridge Works, Driebergen, Netherlands

[21] Appl. No.: 120,977

[22] Filed: Sep. 13, 1993

[30] Foreign Application Priority Data

Feb. 12, 1993 [GB] United Kingdom ............... 9302870

[51] Int. Cl.6 ............................................. F16H 35/04
[52] U.S. Cl. ....................................... 74/650; 74/721; 475/251; 476/69
[58] Field of Search ........................ 74/650, 665, 665 H, 74/721; 475/162, 251; 476/26, 67, 68, 69, 70

[56] References Cited

U.S. PATENT DOCUMENTS

| | | | |
|---|---|---|---|
| 1,364,745 | 1/1921 | Gerber | 74/650 |
| 1,437,510 | 12/1922 | Gerber | 74/650 |
| 1,954,347 | 6/1934 | Coulombe | |
| 4,291,591 | 9/1981 | Ross | 74/650 |

FOREIGN PATENT DOCUMENTS 1181029 6/1959 France .

*Primary Examiner*—Charles A. Marmor
*Assistant Examiner*—Peter Kwon
*Attorney, Agent, or Firm*—McAulay Fisher Nissen Goldberg & Kiel

[57] ABSTRACT

A differential drive mechanism comprises a cage, which is rotatable about a first axis and represents the input, two coaxial output shafts which are rotatable with respect to the cage about the first axis, a coupling which is connected eccentrically to the two output shafts to transmit relative contra-rotational movement between them by connections which permit relative rotation of the coupling and the output shafts about a second axis parallel to the first axis and a restraint member which is coupled to the cage and to the coupling such that the coupling is rotatable with respect to the cage about a third axis perpendicular to the axis and capable of reciprocation in a direction perpendicular to the first axis but prevented from movement in a direction parallel to the first axis. The eccentric connections are constituted by a respective eccentric hole in the inner end of each output shaft in which the associated end of the coupling is received. The inner end of each output shaft is in sliding engagement with the inner surface of the cage whereby as the cage rotates about the first axis the sliding surface on the inner end of each output shaft is pressed by the coupling into contact with the opposing sliding surface on the cage so that a proportion of the input torque transmitted to the cage is transmitted directly to the output shafts through the cooperating sliding surfaces and does not pass through the coupling and restraint members.

9 Claims, 4 Drawing Sheets

DIFFERENTIAL DRIVE MECHANISMS

BACKGROUND OF THE INVENTION

1. Field of the Invention

The present invention relates to differential drive mechanisms, particularly automotive differentials of limited slip type, and is concerned with that type of differential drive mechanism which comprises a cage, which is rotatable about a first axis and represents the input, two coaxial output shafts which are rotatable with respect to the cage about the first axis, a coupling which is connected eccentrically to the two output shafts to transmit relative contra-rotational movement between them by connections which permit relative rotation of the coupling and the output shafts about a second axis substantially parallel to the first axis and a restraint member which is coupled to the cage and to the coupling such that the coupling is rotatable with respect to the cage about a third axis substantially perpendicular to the first axis and capable of reciprocating movement in a direction perpendicular to the first axis but prevented from movement in a direction parallel to the first axis, the eccentric connection of the coupling and the output shafts being constituted by a respective eccentric hole in the inner end of each output shaft in which the associated end of the coupling is received.

2. Description of the Prior Art

Conventional automotive differentials provide a cost effective means of sharing torque equally between the driven wheels. However, the characteristic of always providing equal torque restricts the total to the level which maintains traction at the wheels with minimum grip. If this is close to zero, e.g. due to the fact that one wheel is on very slippery ground, then the total will also be very low even if one wheel has very good grip.

To overcome this disadvantage, various types of limited slip differential have been used of either the speed control or torque control type. The speed control type senses wheel slip after it occurs by the speed difference and transfers torque to the slower wheel accordingly. The torque control type transfers torque from the faster moving wheel before traction is lost.

Various types of torque control automotive differential are known but substantially all of those which are actually used comprise a substantial number of meshing helical gears or alternatively face cams and cam followers with helical sliding surfaces. Such differentials are therefore relatively heavy and expensive and time-consuming to manufacture and are relatively complex. In addition, the areas of the friction surfaces at which friction torque is generated are relatively small which means that the loading per unit area is relatively high and thus that the service life is relatively short.

Numerous differentials of the specific type with which the present invention is concerned and of a generally similar type are also known from the patent literature, e.g. U.S. Pat. Nos. 1,098,422, 1,098,423, 1,364,745, 1,437,510, 1,954,347, 4,155,274, 4,291,591, 2,016,849, 848,931, 1,278,231, 1,854,910, 1,499,480, 1,463,356, 1,663,882 and 1,843,163. However, it is believed that no such differential has ever been manufactured as a commercial product. The reason for this is not known with certainty, but it is believed that, in addition to the fact that many of the differentials disclosed in the patents referred to above are of very complex construction and thus prohibitively expensive to manufacture, they all suffer from the following shortcoming: The entire driveline torque of an automotive engine is normally transmitted through the differential at all times, that is to say through those components whose primary purpose is to permit differential rotational speeds of the two output shafts. In this connection it will be appreciated that the loads to which the differential components are subjected when the vehicle is travelling in a straight line, for instance shock loads, particularly under heavy acceleration, are very considerably greater than the additional loads which are produced when the output shafts rotate at different speeds, particularly because the speed differential is rarely more than a few r.p.m. This means that the components in question must be of very robust and thus expensive construction and furthermore are subjected to very substantial loads, point or line loads in some cases, for extended periods of time and are thus subject to unacceptably premature failure through breakage or wear.

German Patent No. 819628 discloses a differential of the type referred to above which suffers from all the disadvantages referred to above. Thus all the driveline torque of the engine is transmitted through the differential components, i.e. the coupling, the restraint member and the female eccentrics in the output shafts, which means that these components must be of very robust construction but are nevertheless prone to unpredictable premature failure. Furthermore, the substantial loads exerted by the ends of the coupling on the walls of the eccentric holes fall outside the support of the bearing into the cage and result in substantial wear of both these components and in bending of the output shafts which in turn results in excessive wear and premature failure of their bearings.

U.S. Pat. No. 1,954,347 discloses a differential of the type referred to which superficially appears to be of some relevance to the present invention in that the outer surfaces of the output shafts are in close proximity to the inner surface of the cage. However, they are said to be bearing fits within the cage or housing and this makes it clear that it is the intention to minimise contact and friction between the opposed surfaces and this is in stark contrast to the construction of the present invention which relies on frictional sliding contact between the cage and the output shafts to produce the split in the torque path through the differential. The distinction is further made clear by the fact that there is no split in the torque path in the prior patent.

Furthermore, the prior patent makes no provision for containment of the loads and wear regimes that will be experienced, in use, by the differential. As such, the construction of the prior patent suffers from a number of severe disadvantages which, it is believed, were responsible for it never being manufactured as a commercial product. Firstly, with respect to the generation of the load across the sliding interfaces between the coupling and the output shaft, this load is inversely related to the eccentricity of the coupling surface. The eccentricity is necessarily small in the prior patent and any increase in the eccentricity would result in an increase in the overall diameter and thus an unacceptable increase in the size of the differential. Secondly, the interface between the coupling and the output shaft is a line contact only which would cause unacceptably high Hertzian contact stresses and excessive and premature wear. This problem is solved in the present invention by the use of the slippers but this would not be possible in the prior construction since it would again result in an excessively large overall diameter. Thirdly, if the interface of the outer surface of the inner ends of the output shafts and the cage were to support the high loads generated by the small eccentricity necessary in the prior construction, serious problems would arise because no provision is made for the necessary abrasion resistance.

It is the object of the invention to provide a differential drive mechanism of the general type referred to above whose components are required to transmit only a proportion of the normal propulsive power of the vehicle engine or the like and are thus subjected to lower loads than usual and in which the high internal loads are simply supported on frictional surfaces, whereby they may be of lighter and cheaper construction than usual and the differential has a longer service life than known differentials.

SUMMARY OF THE INVENTION

According to the present invention a differential drive mechanism of the type referred to above is characterised in that the ends of the coupling have a part-spherical engagement surface which engages a complementary internal surface within a sleeve which is received in the respective eccentric hole, and that the inner end of each output shaft is in sliding engagement with the inner surface of the cage whereby as the cage rotates about the heretofore mentioned first axis the sliding surface of the inner end of each output shaft is pressed by the coupling into contact with the opposing sliding surface on the cage so that a proportion of the torque transmitted to the cage is transmitted directly to the output shafts through the cooperating sliding surfaces.

Thus in the differential mechanism in accordance with the present invention the external surface of the inner end of each output shaft, which may constitute a half-shaft or a stub shaft connected, in use, to a constant velocity joint or even a very short and perhaps even hollow connecting shaft to which, in use, a further shaft is connected, constitutes a sliding surface which is spaced from the opposed surface of the cage, which also constitutes a sliding surface, such that contact between the output shaft and the cage supports the applied load from the coupling directly and does not cause any resultant tilting moment on the shaft, and so runs on the opposed portion of the internal surface of the cage, which also constitutes a sliding surface. As the cage is rotated by the engine via the restraint and coupling members and the eccentric connections with the output shafts, the force applied to the shafts displaces them laterally so that the sliding surfaces on the output shafts engage the opposing sliding surfaces on the cage on one side. In order that this occurs it is necessary that the nominal clearance between the sliding surfaces, that is to say between the inner ends of the output shafts and the cage, is less than that between the remainder of the output shafts and the cage. The coupling load is thus supported directly by the cage and a proportion of the torque applied to the cage is transmitted to the output shafts directly through the contacting areas of the sliding surfaces, and thus does not pass through the restraint and coupling members at all. In automotive applications the most severe drive torque occurs under conditions of shock load, particularly under harsh engagement of the drive to achieve rapid vehicle acceleration. In such conditions, the shock load is shared between the frictional surfaces and the coupling. This is highly beneficial because it means that the percentage by which the load to which the components of the differential is subjected can typically be reduced by 40% or more. The proportion of the torque which passes through this alternative or bypass path will depend on the pressure with which the sliding surfaces engage one another which in turn depends on the magnitude of the torque which means that the proportion of the total torque or power which passes through the bypass path increases as the engine load or torque increases. This means that the torque bias ratio, i.e. the ratio of the torque applied to the two output shafts, is strongly load sensitive, that is to say increases with increasing load.

When the vehicle turns a corner, that is to say the differential is required to differentiate as well as acting simply as a power transmission unit, the point of contact of the cooperating pairs of sliding surfaces rotates with respect to those surfaces and this creates a frictional resistive torque. This frictional torque increases, but also, due to the conformal nature of the contacting surfaces, the coefficient of friction is low under low loads as lubricant is entrained between the surfaces and increases with load as the lubricant is expelled. Thus the torque bias ratio increases with torque.

The load sensitivity of the torque bias ratio results in highly desirable driving characteristics or "feel" of the vehicle to which the differential is fitted.

In order to control the frictional torque bias ratio when the output shafts rotate at different speeds, the frictional surfaces may be, for example, profiled or have additional lubricant feed paths or may be treated, for example tufftrided, phosphated or nitrided, to control their coefficient of friction and/or increase their abrasion resistance.

Clearly the above mechanisms for generation of frictional torque also occur at the interface of the coupling with the output shafts, but being at a smaller diameter, have a lesser effect on the torque bias ratio. In order to reduce the contact pressure and thus the wear of the engaging surfaces of the coupling and the eccentric holes, the ends of the coupling have a part-spherical engagement surface which engages a complementary internal surface within a sleeve which is received in the respective eccentric hole. The contact load is thus transmitted not through a substantially point or line contact area but through the relatively large area of the external surface of the sleeves. The use of such sleeves also provides protection from abrasive wear on the coupling and output shaft interface due to the alternative surfaces where differential rotational speed can be accommodated. Thus if one surface under rotation starts to generate a higher level of coefficient friction, for example due to the onset of abrasion of the surfaces, the other interface will slip preferentially, reducing the possibility of abrasive damage to the mating surfaces. The sleeves may be stationary in the eccentric holes, whereby the rotational movement between them and the output shafts occurs at the mating part-spherical surfaces and the output shafts reciprocate in a direction parallel to the said axis. Alternatively, the sleeves may be free to slide both axially and rotationally whereby the reciprocating and sliding occurs between the surfaces of the eccentric holes and the outer surfaces of the slippers. In a further alternative, the slippers are axially restrained but free to slide in rotation.

In one embodiment of the invention the coupling and the restraint member constitute respective bars which extend substantially perpendicular to one another. In this embodiment the coupling bar and the restraint bar constitute a cruciform shape with the coupling bar being rotatable about, and movable parallel to, the length of the restraint bar. In one construction, the coupling and restraint member are integral and thus constitute a single cruciform member, the ends of the restraint member being longitudinally slidably and rotatably coupled to the cage. In an alternative construction, the ends of the restraint member are fixedly coupled to the cage and its central portion is received rotatably and longitudinally slidably in a hole in the coupling. Alternatively, these two constructions might be combined so that the restraint bar is only rotatable with respect to the cage and the coupling bar is only slidable with respect to the restraint bar, for instance by providing cooperating splines or the like extending in the direction of the length of the restraint bar on a portion of the external surface of the restraint bar and the internal surface of the hole in the coupling bar.

When the differential of the embodiments described above is installed in a vehicle which is travelling in a straight line, the two output shafts rotate at the same speed and the cage, coupling, restraint member and output shafts all rotate together at the same speed, effectively as a solid body. However, if the vehicle should turn a corner, one output shaft is constrained to rotate at a slower speed and differentiation occurs, that is to say contra-rotational motion is transmitted through the coupling to the other output shaft whose speed thus increases by the same amount. The output shafts thus both rotate with respect to the coupling which reciprocates back and forth in a direction perpendicular to the axis of rotation of the half-shafts and cage and also oscillates in rotation, that is to say rotates back and forth about the axis of the restraint member which extends perpendicular to the axis of rotation of the half-shafts and cage.

In a further embodiment of the invention the coupling is not constituted by a simple bar but by a spur gear and a respective transmission member which is coupled to each output shaft to be rotatable with respect to it about an axis parallel to but offset from the heretofore mentioned first axis and carries rack teeth on its inner surface which extend in a direction perpendicular to the first axis and are in mesh with the teeth on the spur gear whereby rotation of the spur gear about an axis perpendicular to the first axis tends to cause movement of the two transmission members in opposite directions perpendicular to the first axis, the spur gear being carried by a restraint bar which constitutes the restraint member and extends perpendicular to the first axis and whose ends are coupled to the cage so as to be rotatable about and movable parallel to its length, carrier means being provided which prevent relative movement perpendicular to the first axis of the teeth on the spur gear and the rack teeth, whereby as differential rotation of the output shafts occurs the spur gear and restraint bar reciprocate in rotation about the length of the restraint bar and linearly in the direction of the length of the restraint bar. Although apparently very different, this embodiment in fact operates in a manner analogous to that of the first embodiment. When differential rotation of the output shafts occurs, the spur gear oscillates in rotation and when viewed in the direction of its length may be considered to constitute a rocking lever similar to the rocking lever coupling bar of the first embodiment. For this reason the spur gear need not have teeth over its entire periphery but need only have two opposed groups of teeth in mesh with respective racks. The bypassing of the differential components by a significant proportion of the applied propulsive load is achieved in this embodiment in precisely the same way as in the preceding embodiments and the same advantages are therefore also achieved.

Since the linear reciprocating motion of the coupling with respect to the cage is necessary for the contra-rotation of the output shafts when differentiation occurs, it is necessary that sliding motion of the spur teeth and rack teeth in a direction perpendicular to the axis of the half-shafts is prevented. This may be effected in various ways, but in one construction the spur gear is discontinuous along the length of the restraint bar and is divided into two portions by a peripheral shoulder, the rack teeth also being divided into two portions in mesh with respective portions of the spur gear, the inner ends of the two rack teeth portions being situated adjacent the shoulder whereby relative movement of the racks and the spur gear in a direction perpendicular to the said axis is prevented.

In those constructions in which the restraint bar reciprocates linearly with respect to the cage in a direction perpendicular to the axes of the output shafts, its ends may simply be slidably received in open holes in the cage and will thus project through these holes by a cyclically varying distance when differential rotation of the output shafts occurs.

Further features and details of the invention will be apparent from the following description of two specific embodiments which is given by way of example with reference to the accompanying diagrammatic drawings, in which:

DESCRIPTION OF THE PREFERRED EMBODIMENTS

Figure 1:
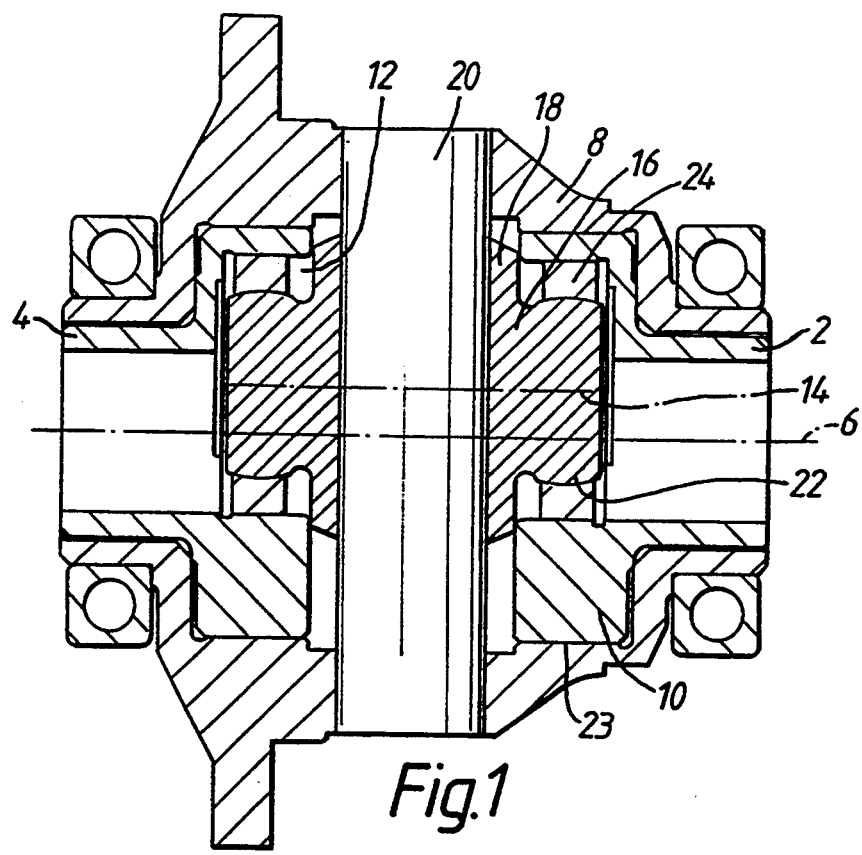
FIG. 1 is a sectional view of a first embodiment of an automotive differential in accordance with the invention.
Figure 2:
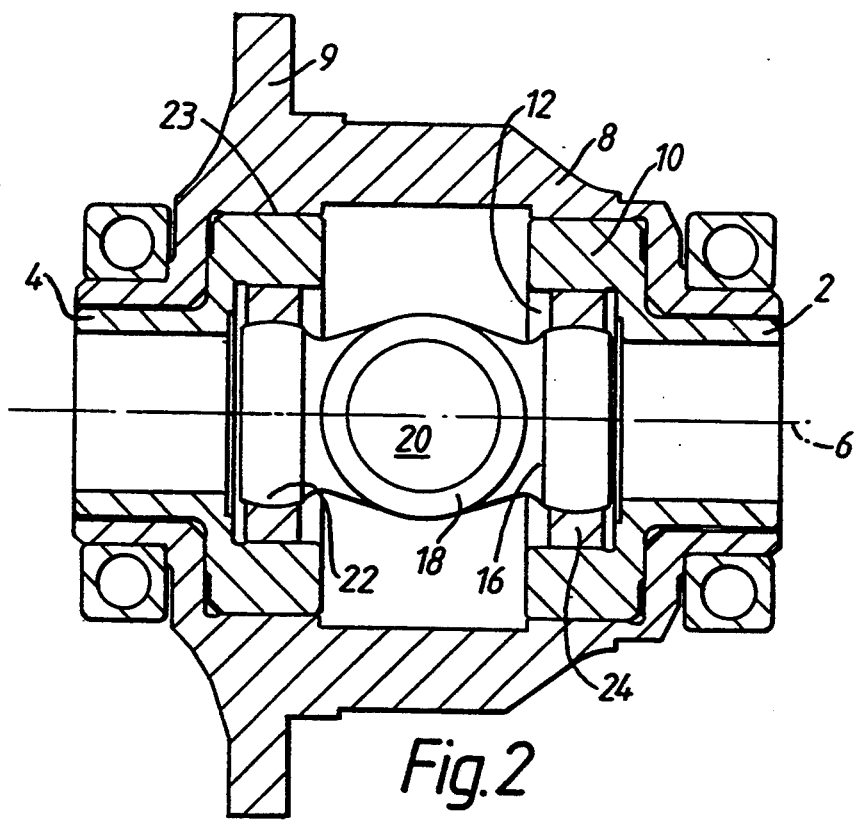
FIG. 2 is a further sectional view of the differential of FIG. 1 but at right angles to the view of FIG. 1.

The differential of FIGS. 1 and 2 includes two output shafts 2 and 4, which are rotatable about a common axis and pass through, and are rotatable with respect to, a cage 8 which is also rotatable about the axis 6. The cage has an end cover 9 which is the final drive flange through which rotational movement is transmitted to the cage. At their inner ends the output shafts have a thickened portion 10 in which a cylindrical hole or recess 12 is formed, the axis 14 of which is parallel to but offset from the axis 6. Received in the holes 12 are the ends of a coupling bar 16 at whose centre there is a tubular portion 18 defining a hole whose axis is perpendicular to the axis 6. Slidably and rotatably received in this hole is a restraint bar 20.

The ends of the restraint bar 20 are fixedly secured to opposed sides of the cage 8. At its ends the coupling bar 16 carries part-spherical segments 22 whose surface engages the complementary internal surface of a respective sleeve 24 which is slidably received in the associated eccentric hole 12.

The external surface of each thickened portion 10 is of circular shape and is spaced by a clearance from the opposed circular portion of the internal surface of the cage, which is less than the clearance between the output shafts 2 at the point at which they pass through the cage, so that contact may not occur at that point. A sliding interface 23 is thus defined between each thickened portion and the cage.

Figure 2A:
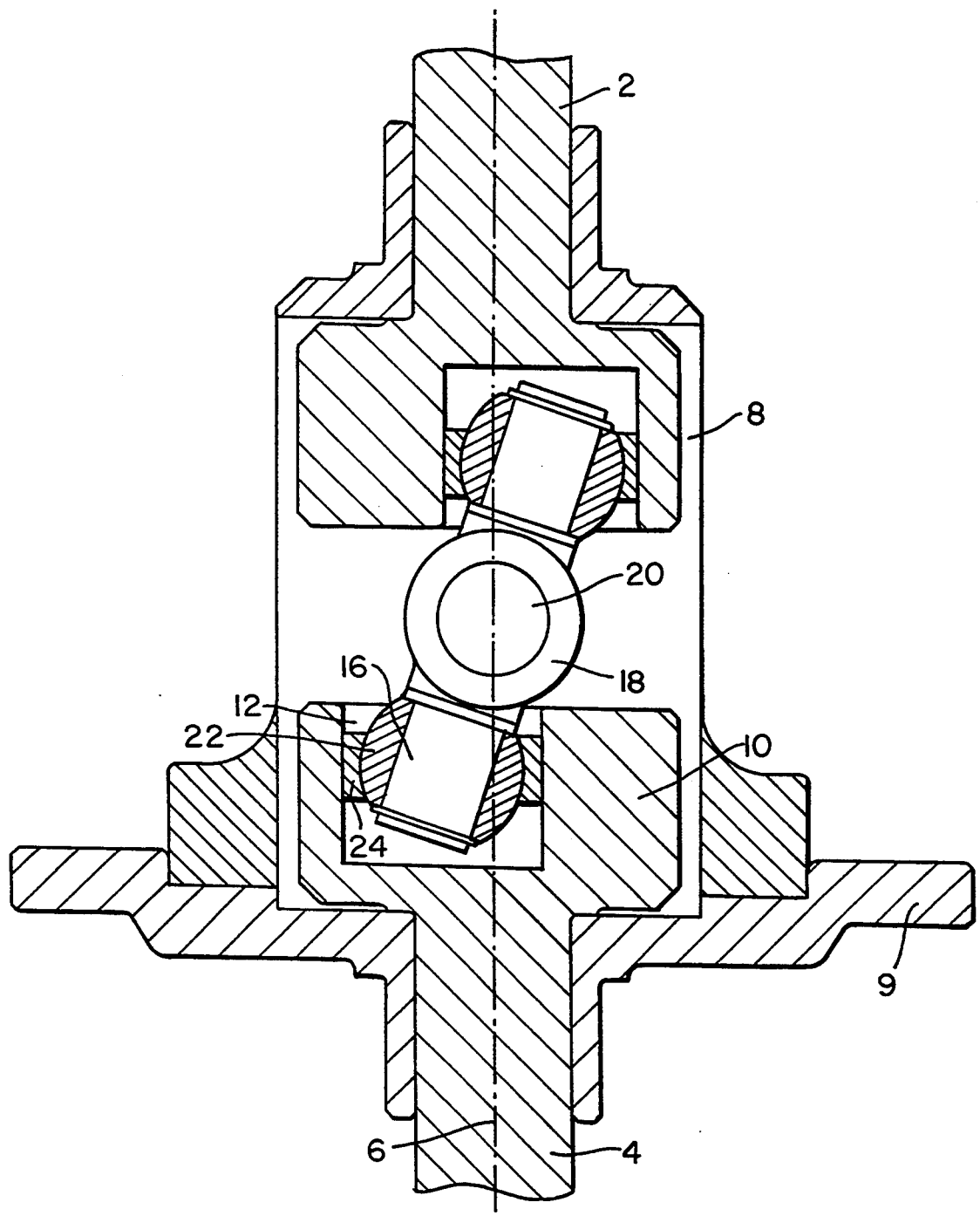
FIG. 2A is a further sectional view of the differential of FIG. 1 but with the cage rotated through 90° and one output shaft rotated through 180° with respect to the other output shaft.

In use, when a vehicle, to which the differential is fitted, travels in a straight line, the cage is rotated about the axis 6 and thus rotational movement is transmitted through the restraint and coupling bars 20,16 to the output shafts 2,4 and all the illustrated components rotate at the same speed and do not move either linearly or in rotation with respect to one another. A substantial proportion of the propulsive torque of the engine is transmitted from the cage 8 to the restraint bar 20 and thence to the coupling bar 16. This load displaces the output shafts by a small distance perpendicular to the axis 6 and thus presses one side of the outer surface of the thickened portions 10 into contact with the corresponding portion of the inner surface of the cage 8 with a force which increases with the propulsive torque. This contact effectively constitutes a force-locking connection between the cage and the output shafts and a significant proportion of the propulsive torque is thus transmitted directly from the cage to the output shafts and bypasses the restraint and coupling bars which can thus be of lighter construction than usual and are subject to a reduced tendency to failure. If the vehicle should turn a corner, one of the output shafts rotates at a slower speed and thus contra-rotates with respect to the other output shaft. This movement causes linear movement of the coupling bar 16 along the length of the restraint bar 20 and rotational movement about it and this movement is transmitted to the other output shaft as a corresponding increase in rotational speed by the reciprocating rocking motion of the coupling bar. The coupling bar thus reciprocates linearly in the plane of FIG. 1 and oscillates in rotation in the plane of FIG. 2 at a rate determined by the differential speed of the two output shafts. When the coupling bar is at each end of its linear reciprocation stroke it will be orientated as seen in FIG. 2 and when midway in its linear reciprocation stroke will be oriented with its longitudinal axis inclined to one side or the other side of the axis 6, as seen in FIG. 2A. The oscillatory movement of the coupling bar results in the ends 14 and the sleeves 24 reciprocating back and forth in the eccentric holes 12. The force transmitted from the coupling bar to the thickened portions 10 is transmitted over the relatively large area of the external surface of the sleeves 24 and thus no excessively large contact loads are produced whereby wear of the cooperating surfaces of the sleeves 24 and thickened portions 10 is minimised. The contra-rotation of the output shafts results in the areas of contact between the thickened portions 10 and the internal surface of the cage contra-rotating also. This generates a frictional torque where both the normal force and the coefficient of friction are load dependent, which means that the torque bias ratio of the differential increases with increasing load.

When the output shafts of the construction described rotate at different speeds the coupling bar necessarily reciprocates in the plane of the paper, as seen in FIGS. 1 and 2. In the construction illustrated in those Figures, this reciprocation is accommodated by the sleeves 24 reciprocating in the holes 12. However, in the modified construction shown in FIG. 3, such reciprocation is restrained by annular rings 25 whereby the sleeves 24 are free to slide only in rotation in the holes 12 and not longitudinally. This construction is for use in cases where the output shafts 2 are to be connected to shafts which are connected to respective constant velocity joints which are inherently adapted to accommodate such longitudinal movement. In this case the reciprocation of the coupling is simply absorbed by the constant velocity joints and no provision for it need be made in the differential itself.

Figure 3:
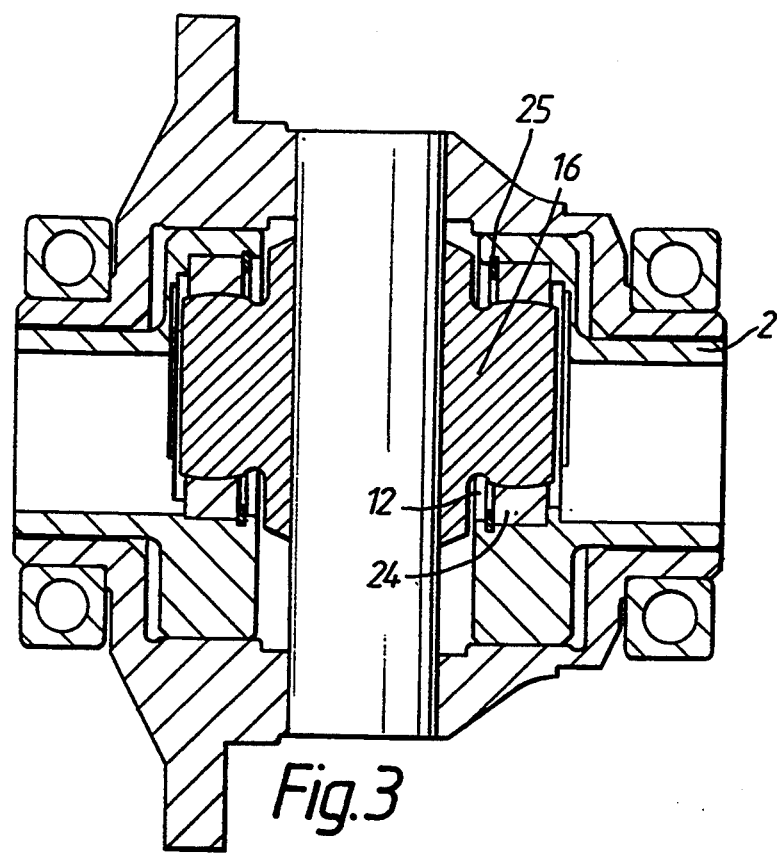
FIG. 3 is a view similar to FIG. 2 of a modified version of the first embodiment.

In the embodiments of FIGS. 1 to 3 the cooperating sliding surfaces on the inner ends of the output shafts and the cage are smooth, that is to say circular cylindrical surfaces. However, this is not essential and these surfaces may be complementarily profiled in the axial direction, e.g. provided with complementary V groove or multiple V groove profiles. This will increase the proportion of the total torque which passes through the bypass path.

Figure 4:
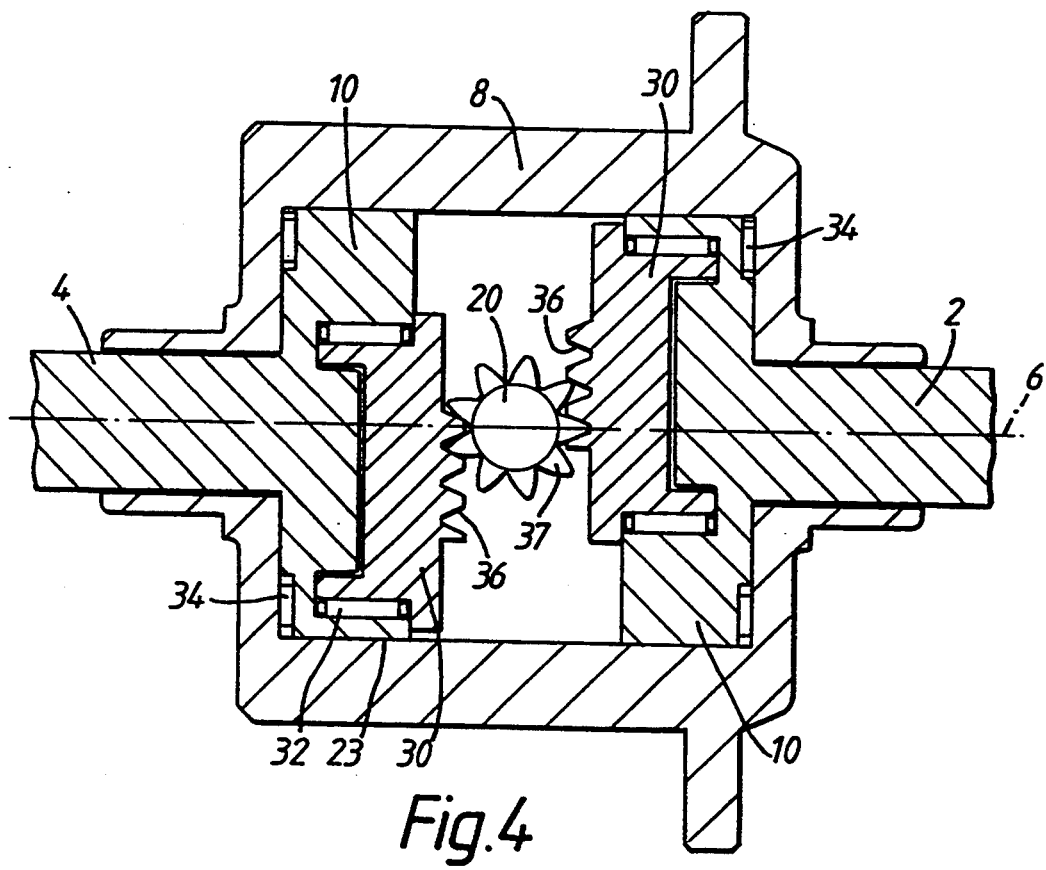
FIG. 4 is a view similar to FIG. 2 of a second embodiment but with one output shaft rotated through 90° with respect to the other output shaft.
Figure 5:
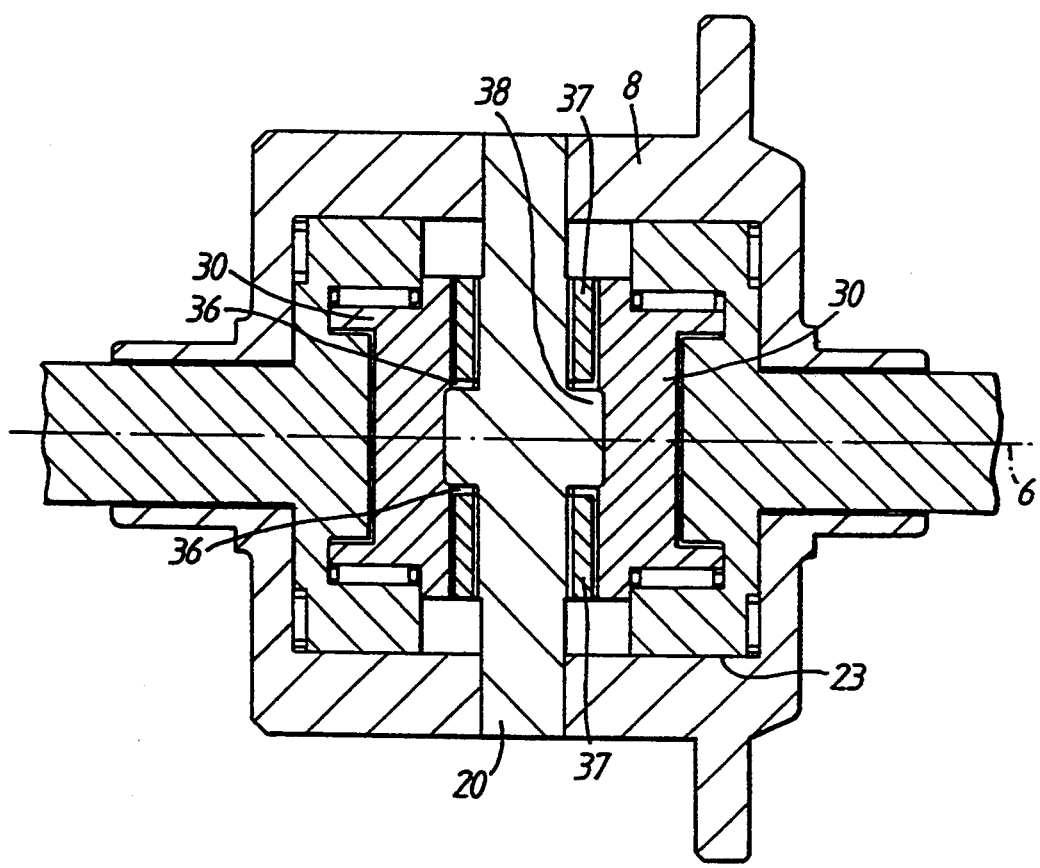
FIG. 5 is a view of the differential of FIG. 4 rotated through 90°.

The embodiment of FIGS. 4 and 5 differs from the preceding embodiment in that the eccentric circular holes at the inner ends of the output shafts 2, 4, which in this case are half-shafts, receive respective circular transmission elements 30 which are readily rotatable about their axis by virtue of needle roller bearings 32 and needle thrust bearings 34. On their inner surfaces the transmission elements 30 carry respective racks 36, which, as seen in FIG. 4, each extend in a direction perpendicular to the axis 6 and are split into two portions in this direction with a gap between the two portions. The coupling comprises a spur wheel 37 which is carried by a restraint bar 20 and whose teeth engage those of both racks and are split into two portions in a similar manner, the two portions being separated by a shoulder or portion of enlarged diameter 38 on the restraint bar. The ends of the restraint bar 20 are slidably and rotatably received in opposing holes in the cage 8. The outer surface of the enlarged portions 10 again engages the opposed areas of the internal surface of the cage 8 at a sliding interface 23, which operates precisely as described above.

In use, if one half-shaft should be retarded relative the other it rotates relative to the cage and this rotational movement is transmitted by the associated transmission element, which rotates about its axis with respect to the half-shaft, to the spur wheel 36 which is also caused to move in the direction of the length of the restraint bar by the engagement of the inner ends of one or other portion of rack teeth with the shoulder 38.

Movement of the spur wheel 36 parallel to the length of the restraint bar 20 relative to the rack of the other transmission member is prevented by engagement of the ends of one or other portion of the rack teeth with the shoulder 38 and thus the rotational and longitudinal motion of the spur wheel is transmitted as contra-rotational motion to the other half-shaft whose speed is therefore increased by a corresponding amount. The restraint member 20 thus reciprocates linearly in the direction of its length and in rotation about its length at a rate which is determined by the differential speed of the half-shafts.

Obviously, numerous modifications and variations of the present invention are possible in the light of the above teachings. It is therefore to be understood that within the scope of the appended claims, the invention may be practiced otherwise than as specifically described herein.

What is claimed as new and desired to be secured by Letters Patent of the United States is:

1. A differential drive mechanism comprising a cage which has an inner surface and is rotatable about a first axis and represents an input, two coaxial output shafts which are received in respective holes in said cage have respective inner ends within said cage, and are rotatable with respect to said cage about said first axis, a coupling which has two ends and is connected eccentrically to said two output shafts to transmit relative contra-rotational movement between them by connections which permit relative rotation of said coupling and said output shafts about a second axis substantially parallel to said first axis, and a restraint member which has two ends and is coupled to said cage and to said coupling such that said coupling is rotatable with respect to said cage about a third axis substantially perpendicular to the said first axis and capable of reciprocating movement in a direction perpendicular to said first axis but prevented from movement in a direction parallel to said first axis, the eccentric connection of said coupling and said output shafts being constituted by a respective eccentric hole formed in said inner end of each said output shaft in which the associated end of said coupling is received, said ends of said coupling having a part-spherical engagement surface, a sleeve which affords a complementary part-spherical internal surface being received in each said eccentric hole, each said engagement surface being in engagement with a respective said complementary internal surface, said inner end of each said output shaft having an external surface which constitutes a sliding surface in sliding engagement with an opposed portion of said inner surface of said cage, which constitutes a sliding surface, the clearance between said opposed sliding surfaces being less than that between said output shafts and the edges of said holes in said cage in which they are received, whereby as said cage rotates about said first axis the said sliding surface of said inner end of each said output shaft is pressed by said coupling into contact with said opposed sliding surface on said cage so that a proportion of the input torque transmitted to said cage is transmitted directly to said output shafts through said cooperating sliding surfaces.

2. A mechanism as claimed in claim 1 wherein each said sleeve is slidable within the associated eccentric hole in rotation and parallel to said first axis.

3. A mechanism as claimed in claim 1 wherein each said sleeve is slidable within the associated eccentric hole in rotation but is restrained so as to be fixed parallel to said first axis.

4. A mechanism as claimed in claim 1 wherein said cooperating sliding surfaces are subjected to a treatment consisting of at least one of phosphation, nitridation and heat treatment to increase their abrasion resistance.

5. A mechanism as claimed in claim 1 wherein said coupling and said restraint member constitute respective bars which extend substantially perpendicular to one another.

6. A mechanism as claimed in claim 5 wherein said coupling and said restraint member are integral and thus constitute a single cruciform member, said ends of said restraint member being longitudinally slidably and rotatably coupled to said cage.

7. A mechanism as claimed in claim 5 wherein said ends of said restraint member are fixedly coupled to said cage, said coupling defines a hole and a central portion of said restraint member is received rotatably and longitudinally slidably in said hole in said coupling.

8. A mechanism as claimed in claim 1 wherein said coupling constitutes a spur gear carrying teeth and two transmission members which are coupled to respective ones of said output shafts to be rotatable with respect to it about an axis parallel to but offset from said first axis and carry rack teeth on their inner surfaces directed towards one another which extend in a direction perpendicular to the said first axis and are in mesh with said teeth on said spur gear whereby rotation of said spur gear about an axis perpendicular to the said first axis tends to cause movement of said two transmission members in opposite directions perpendicular to said first axis, said spur gear being carried by a restraint bar which constitutes said restraint member and extends perpendicular to said first axis, said ends of said restraint member coupled to said cage so as to be rotatable about and movable parallel to its length, carrier means being provided which prevent relative movement perpendicular to said axis of said teeth on said spur gear and said rack teeth, whereby as differential rotation of said output shafts occurs said spur gear and said restraint bar reciprocate in rotation about the length of said restraint bar and linearly in the direction of the length of said restraint bar.

9. A mechanism as claimed in claim 8 wherein said spur gear is discontinuous along the length of said restraint bar and is divided into two portions by a peripheral shoulder, said rack teeth also being divided into two portions in mesh with respective portions of said spur gear, the inner ends of said two rack teeth portions being situated adjacent said shoulder whereby relative movement of said rack teeth and said spur gear in a direction perpendicular to said first axis is prevented.

* * * * *

UNITED STATES PATENT AND TRADEMARK OFFICE
CERTIFICATE OF CORRECTION

PATENT NO. : 5,435,210
DATED : July 25, 1995
INVENTOR(S) : John W. Moore, et al

It is certified that error appears in the above-indentified patent and that said Letters Patent is hereby corrected as shown below:

On title page, item

[73] Assignees: Ricardo Consulting Engineers Limited, Bridge Works, Shoreham-by-Sea, ENGLAND; Axial Wave Drive BV, Driebergen, NETHERLANDS

Signed and Sealed this

Fourteenth Day of November, 1995

Attest:

BRUCE LEHMAN

Attesting Officer

Commissioner of Patents and Trademarks